Oct. 23, 1962        D. L. SMITH        3,059,282
METHOD OF COATING EMPLOYING AN INVESTMENT MOLD
Filed May 29, 1959
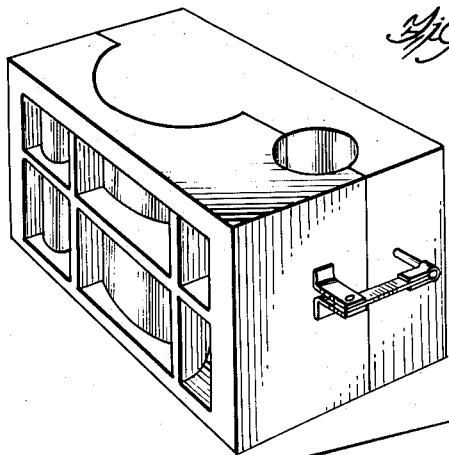
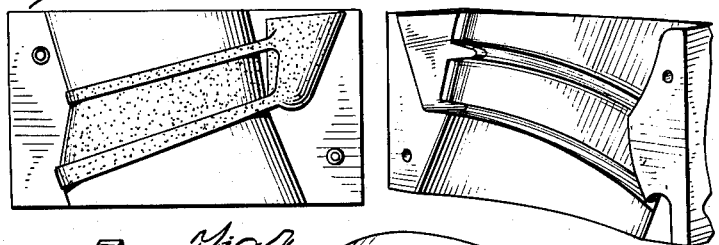
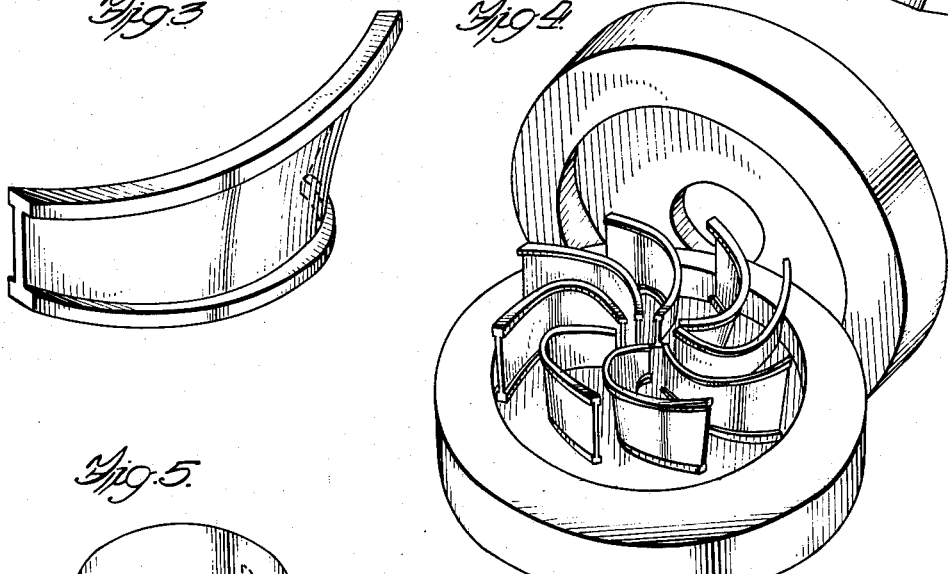
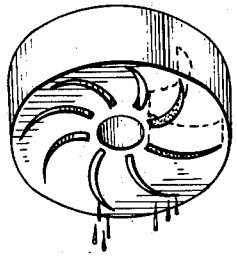

United States Patent Office 3,059,282
Patented Oct. 23, 1962

3,059,282
METHOD OF CASTING EMPLOYING AN
INVESTMENT MOLD
Dan L. Smith, Portland, Oreg., assignor to Esco
Corporation, a corporation of Oregon
Filed May 29, 1959, Ser. No. 816,712
12 Claims. (Cl. 18—58)

This invention relates to a method of casting and, more particularly, to a casting method involving the use of an investment mold.

Investment molding procedures are employed in those casting methods where the casting is of a type that cannot be fashioned in the usual technique. Investment molding contemplates the use of disposable pattern material—the material, for example, being melted or otherwise fluidized and drained from the sand mold. This permits fabrication of a wide variety of intricate castings not possible with the usual indestructible patterns. The conventional indestructible patterns, if fashioned into the complex shapes which can be employed in this invention, could not be removed from the mold without destroying the mold.

In the past, investment molding has been attended by a number of problems. Foremost among these was dimensional stability of the pattern material. Where the material employed, such as wax, was heat-expansible relative to the mold, often the mold itself was damaged in the act of removing the pattern. So the very object of investment molding was not achieved. Another problem lay in the fragility or brittleness of the investment pattern material. Previously-employed materials often could not stand the shocks and rough handling usually associated in casting operations. Thus, again, the important object of casting complex shapes was not attained. Still further, previously-employed materials required special handling and were costly, so that the beneficial results of investment molding techniques were only imperfectly realized.

It is an object of this invention to provide a novel casting method, more specifically, a casting method employing investment molding. Another object is to provide a casting method employing investment molding in which a novel pattern material is employed. Still another object is to provide a novel disposable pattern material and the use thereof which overcomes the drawbacks characteristic of materials previously employed for this purpose. Yet another object is to provide a pattern material for use in investment molding in which the material is characterized by a high degree of dimensional stability, especially in the important range of between room temperature and its melting-point.

A further object of this invention is to provide a novel pattern material for the uses listed above which includes urea. A still further object is to provide a urea pattern material for investment molding in which the material is treated beforehand to eliminate any objectionable porosity. Other objects and advantages of the invention can be seen as this specification proceeds.

The invention will be explained in conjunction with the accompanying drawing, in which:

FIG. 1 is a mold employed for the fabrication of a pattern;

FIG. 2 is the mold of FIG. 1 but in opened condition and showing the solidified pattern material;

FIG. 3 is a perspective view of a completed pattern in the shape of a pump vane after removal from the mold of FIGS. 1 and 2;

FIG. 4 is a perspective view of a group of disposable patterns placed within a core box and prior to filling the core box with investment material; and FIG. 5 is a perspective view of a core constructed of investment material and showing the disposable pattern material melting therefrom.

In one embodiment of the invention, I employ a urea pattern material which is fashioned into a pattern and thereafter is fluidized for quick removal as by being heated to its melting-point while in a mold. The urea pattern material may be urea itself. Ureas with low ash contents are especially useful, and the commercial grade has been found satisfactory in investment molding procedures. Urea is a tonnage product and is available from a number of manufacturers, i.e., Kaiser Chemical Company and E. I. du Pont de Nemours & Co.

Under certain circumstances, it may be desirable to fortify the urea with one or more other materials. This may be done advantageously in the practice of the invention. During melting and holding of the urea prior to casting of the pattern, it may be difficult to limit localized overheating of the investment pattern material. When localized overheating occurs, gas may be generated which results in porosity of the pattern. Where the porosity is objectionable, materials effective to minimize the deleterious effect of gas generation may be incorporated into the urea. Plasticizing materials are useful for this purpose, and an excellent material is sugar, i.e., sucrose.

Where the urea is combined with the plasticizing substance, best results are obtained with those materials which depress the melting-point of the mixture, thereby minimizing thermal decomposition and therefore gassing. Sucrose is effective to reduce the melting-point of urea. I have found it to be an excellent plasticizer, strengthening the urea and rendering production of good patterns much easier. It appears to render innocuous the gas produced by local overheating. It is believed to either diminish the gas solubility in the melting mix or increase the gas solubility in the solid.

In certain foundry installations where humidity conditions are excessive, the pattern surface may deteriorate somewhat because of its hygroscopic character. Sucrose is hygroscopic but does not seriously affect the overall nature of the mix since relatively small proportions of sugar are employed. Proportions of sugar in the range of about 1/4% to 10% of the weight of urea have been used satisfactorily, with percentages around about 2% appearing to be optimum. With the higher percentages of sucrose and with humidities in excess of about 90%, some pattern stickiness is encountered. This may necessitate having to wipe the patterns with alcohol-wet rags, or the like.

Where substantially pure urea is employed as the pattern material, any gas that might be evolved as a result of thermal decomposition may be avoided in the inventive procedure by subjecting the material to subatmospheric pressure while the material is in a molten state. Best results are obtained, however, when both a gas inhibitor such as sucrose and vacuum de-gassing are employed.

In some instances, it may be desirable to add a wetting agent such as Dupanol M.E., obtained from E. I. du Pont de Nemours & Co. The wetting agent tends to prevent laps and wrinkles on the surface of the cast pattern, making mold temperature less critical. I have found that sucrose is also helpful in this respect.

Facilitating the production of patterns is the incorporation in the pattern material of a dye to provide an inspection aid. The dye is effective in reducing eyestrain and aiding in the inspection of cast patterns. I have found that color is not important, and a wide variety of water-soluble dyes will work in urea. Useful for this purpose is a red dye marketed by the Geigy Chemical Company under the name "Erio Rubine B Supra." Trademarked dyes such as "Rit" and "Tintex" have also been found satisfactory. Lamp black is also satisfactory, although in some instances it tends to agglomerate and settle out.

The urea pattern material can be fashioned into a wide variety of shapes prior to its introduction into the mold. These can be obtained either by introducing the molten material into a fashioning mold or by building up a fragmentary pattern. Illustrative of the latter is the fusing or glueing of two pattern portions together.

A wide variety of mold materials may be satisfactorily employed in conjunction with the urea-containing pattern material. Illustrative of a suitable mold material is sand bonded with hydrolyzed ethyl silicate.

Specific examples of the practice of the invention are set forth below:

*Example I*

About 25 lbs. of urea (commercial grade), purchased from the Kaiser Chemical Company, was heated to a temperature of about 140° C. to insure that all of the urea was above its melting-point of 130° C. While the urea was in a molten state, a vacuum was applied thereto of the order of about 26–29" Hg. Thereafter, the urea, while in a molten state, was poured into an aluminum mold having the internal configuration of a vane for a centrifugal pump. The urea, after cooling, was removed from the mold by separating the mating mold portions. A similarly processed riser of urea was then fused onto the blade replica by pressing a hot metal object against the indicated line of union on the blade fragment, to cause fusion of the blade fragment and riser. A slight irregularity characterized the line of fushion and this was patched with wax of the character marketed for investment molding. The specific wax employed here was Van Waters and Rogers micro-crystalline wax.

The composite shape provided by the blade fragment and riser was then invested with a silica bonded sand mold, employing the usual flask. The particular sand employed was 60% BSS Australian zircon with 40% zircon flour. The flask, mold and pattern were then placed in a 600° F. mold oven for two hours, at the end of which time the urea had all melted and run out, leaving a clean, smooth mold cavity.

The urea decomposed at this temperature, leaving an infusible residue. I have noted that this residue can be thermally decomposed to a combustible carbonaceous residue. Some of the residual compound was placed back in the mold to simulate the production of shapes which cannot drain completely. The mold was heated by means of a torch for six hours, the temperature of the mold being about 1800° F. Thereafter stainless steel, type 316, was poured into the mold. After cooling and removing the sand mold, the steel casting was found to be usable and showed no defects attributable to the mold. The casting showed the smooth, sound surface usually expected of an investment casting.

Depending upon the composition of the urea-containing pattern material, the subsequent heating step employed to vaporize the residual pattern material may be varied somewhat. Other heating means may be employed for removing the last traces of the pattern material from a mold about a pattern constructed so as to prevent complete drainage of the molten pattern material.

*Example II*

Illustrative of the employment of a fortified urea pattern material is the following formulation:

| | | |
|---|---|---|
| Urea | lbs | 12 |
| Sucrose | oz | 4 |
| Dupanol ME | grams | 10 |
| Red dye | do | 2 |
| Silicone oil | drops | 2 |

The urea was obtained from the Polychemicals Department of E. I. du Pont de Nemours & Co. Commercial cane sugar was employed for the sucrose, while the red dye and wetting agent (Dupanol ME) were obtained from the sources set forth above. The silicone oil was obtained from the General Electric Company under the name SF96. The ingredients were weighed into an enamelled iron kettle and heated slowly, with occasional stirring, until complete fushion had occurred. Thereafter, the mixture was poured into an aluminum mold to produce vanes for a centrifugal pump.

Four sets of vanes were produced. These were used by setting into prints in the core box in which the cores for the impeller were produced. The molding mixture consisted of a round grain zirconite Australian beach sand, AFS grain size about 120. About 80 lbs. of the zirconite sand was mixed thoroughly with 40 lbs. of 400 grain size zirconite flour obtained from the Foote Mineral Company.

To complete the molding mixture, an accelerator consisting of 1000 cc. of ethanol and 150 grams of ammonium acetate, was provided. Also provided was a solution of hydrolyzed ethyl silicate consisting of 5 gallons of ethyl silicate, 3400 cc. water, and 20 cc. of 3% hydrochloric acid. The silicate was obtained from Carbon & Carbide Chemicals Corp. 100 cc. of the ethanol-ammonium acetate accelerator was mixed with 2500 cc. of the hydrolyzed ethyl silicate solution. 45 lbs. of the sand mix, i.e., the zirconite sand and zirconite flour, were stirred into the mixed liquid ingredients and the mixing was completed by stirring in a vacuum (25–29" Hg) for one and one-half minutes. The mix was then poured into the box under vibration. Setting occurred 3½ minutes after the start of mixing and the core, with urea vanes in place, was removed from the box.

One set of urea vanes was removed by solution in warm water and the core was set to dry. Another core was dried with the vanes in place and the vanes removed by placing for two hours in a 400° F. oven. Another set of vanes was removed by placing it in a 600° F. oven. Still another core was dried with the vanes in place and placed directly into a "burn-out" oven at 1500° F. In each of the four sets of vanes, an excellent casting was provided.

The silicone oil employed in the pattern formulation set forth above has been found effective in suppressing the tendency to foam caused by the presence of the wetting agent. Also helpful in the molding procedure is the use of a silicone grease such as Dow-Corning No. 7 silicone release agent for use as a parting agent to prevent sticking to the mold. This is especially helpful when a wetting agent is included. When the urea wets the mold, it may stick most tenaciously.

In the procedure outlined above, the investment casting method is conventional except for having the mixer in a vacuum chamber. This is of substantial value, since it provides a much more complete de-aeration. De-aeration is more complete because the vacuum pump associated with the vacuum chamber does not have to work against the head of slurry in the container. Bubbles are removed from the whole mass of slurry with equal efficiency, as the whole mass is turned over several times during mixing. Further, the slurry can be kept semi-solid and still will de-bubble as the action keeps air bubbles mobile even though the mass is of putty-like consistency. Another advantage of this procedure lies in the ability to reduce drying shrink by reducing the amount of binder.

It is also possible to introduce semi-solid investment material into the core box by extrusion, as contrasted to pouring. This reduces entrainment of air during the investment process.

When it is desired to reduce the hygroscopic character of the mix, small quantities of various formaldehyde materials can be added to the mix. For example, addition of ½% to 20% of paraformaldehyde diminishes the hygroscopicity. It is thought that this operates through producing a low molecular weight urea resin in the melt. The addition of ½% of this agent refines the grain, producing a fine columnar grain which is brittle. 2% addition materially reduces hygroscopicity, while 5% increases the strength. The addition of 10% of paraformaldehyde results in an even stronger melt but one that is still brittle. The mix including 20% paraformaldehyde is quite plastic and strong and is characterized by some water resistance. Best results are obtained when the 20% mix is thereafter diluted back to 10% by the addition of further melt. It is believed that the properties of the resultant 10% melt were superior to the melt provided with merely the addition of 10% paraformaldehyde because the resin formed was of higher molecular weight.

I have found that the pattern material of the invention can be satisfactorily fluidized by dissolving it in water. This procedure is highly desirable in some cases as removal of the pattern before drying gives much greater latitude in formulation of the molding mixture, since it no longer needs to have a minimal drying shrinkage. Illustrative of this aspect of the invention is the following example:

Example III

A urea core was carved out of substantially pure urea to a shape corresponding to a cavity required in a vane. Alternatively, the urea core can be molded, if desired. The shaped core was inserted into a mold used to form patterns. A conventional wax pattern was then produced by injection of wax into the mold, embedding the urea core in the wax. The urea was then dissolved by soaking overnight in cold water, leaving a cavity in the wax exactly duplicating the urea core. Thereafter, the wax vane was invested with the investment material described hereinbefore, the investment material filling the hole left by the removal of the urea core. This resulted in forming a refractory core in the part duplicating the urea core. Upon melt-out of the wax, this refractory core remained and produced a cavity in the metal part, i.e., the vane, duplicating the original urea core.

The employment of urea in this operation is advantageous, especially when the core required is small, very intricate, or too delicate to handle, as by casting a ceramic core into the pattern with the core prints protruding.

While, in the foregoing specification, I have set forth detailed descriptions of embodiments of the invention, it will be apparent to those skilled in the art that many variations in those details may be made without departing from the spirit and scope of the invention.

I claim:

1. In a casting method, the steps of fabricating a pattern of a material comprising urea, investing the said pattern with mold material, solidifying the said mold material, fluidizing the said pattern material, and removing the said pattern material from the solidified mold material.

2. In a casting method, the steps of fabricating a pattern of a material comprising urea, investing the said pattern with mold material, solidifying the said mold material, fluidizing the said pattern material by heating the invested pattern to a temperature at least that of the melting-point of the pattern material, and draining the said pattern material from the solidified mold material.

3. In a casting method, the steps of fabricating a pattern of a material comprising urea, investing the said pattern with mold material, solidifying the said mold material, fluidizing the said pattern material by heating the invested pattern to a temperature at least that of the melting-point of the pattern material, draining the said pattern material from the solidified mold material, and heating the solidified mold material subsequent to drainage of the said pattern material therefrom to a temperature and for a time sufficient to pyrolyze residual pattern material remaining in said solidified mold material after drainage thereof.

4. In a casting method, the steps of fabricating a pattern of a material comprising urea, investing the said pattern with mold material, solidifying the said mold material, fluidizing the said pattern matterial by employing water to dissolve the said pattern, and draining the said pattern material from the solidified mold material.

5. In a casting method, the steps of degassing molten urea, fashioning the urea into a pattern, investing the said pattern with mold material, solidifying the said mold material, fluidizing the said pattern material, and removing the fluidized pattern material from the solidified mold material.

6. In a casting method, the steps of fabricating a pattern of a material comprising unreacted urea, investing the said pattern with mold material, solidifying the said mold material, fluidizing the said pattern material, and removing the fluidized pattern material from the solidified mold material.

7. In a casting method, the steps of fabricating a pattern of a material comprising urea and a material soluble in urea, said soluble material being effective to lower the melting-point of urea, investing the said pattern with mold material, solidifying the said mold material, fluidizing the said pattern material, and removing the fluidized pattern material from the solidified mold material.

8. The method of claim 7 in which said soluble material is sucrose.

9. The method of claim 7 in which the pattern material is degassed prior to pattern fabrication.

10. In a casting method, the steps of subjecting a pattern material comprising urea to subatmospheric pressure while said material is in a molten state, fashioning said material into a replica of an article to be cast, investing said replica with a molding composition to cause solidification of the molding composition about the replica, and removing the said material from the solidified molding composition by fluidizing the said material.

11. In a casting method, the steps of subjecting a pattern material comprising urea to subatmospheric pressure while said material is in a molten state, said material including an agent effective to reduce the hygroscopic character of urea, fashioning said material into a replica of an article to be cast, investing said replica with a molding composition, causing solidification of the molding composition about the replica, and removing the solidified molding composition by fluidizing the said material.

12. The method of claim 11 in which said agent is paraformaldehyde.

References Cited in the file of this patent

UNITED STATES PATENTS

| | | |
|---|---|---|
| 1,536,881 | Ellis | May 5, 1925 |
| 2,136,404 | Wheeler | Nov. 15, 1938 |
| 2,315,394 | Brosius | Mar. 30, 1943 |
| 2,476,994 | Milton et al. | July 26, 1949 |